US011400852B2

(12) United States Patent
Connolly

(10) Patent No.: US 11,400,852 B2
(45) Date of Patent: Aug. 2, 2022

(54) RV SHELL AND METHOD OF MANUFACTURE

(71) Applicant: Thor Tech, Inc., Elkhart, IN (US)

(72) Inventor: John Eugene Connolly, Kenton, OH (US)

(73) Assignee: ThorTech, Inc., Elkhart, IN (US)

( * ) Notice: Subject to any disclaimer, the term of this patent is extended or adjusted under 35 U.S.C. 154(b) by 37 days.

(21) Appl. No.: 17/039,179

(22) Filed: Sep. 30, 2020

(65) Prior Publication Data

US 2022/0097592 A1 Mar. 31, 2022

(51) Int. Cl.
*B60P 3/32* (2006.01)
*B62D 25/06* (2006.01)
*B62D 25/08* (2006.01)
*B62D 25/20* (2006.01)
*B62D 65/02* (2006.01)
*B62D 33/06* (2006.01)

(52) U.S. Cl.
CPC ............... *B60P 3/32* (2013.01); *B62D 25/06* (2013.01); *B62D 25/08* (2013.01); *B62D 25/20* (2013.01); *B62D 65/02* (2013.01); *B62D 33/0612* (2013.01)

(58) Field of Classification Search
CPC ... B60P 3/00; B60P 3/32; B62D 65/00; B62D 65/02; B62D 25/06; B62D 25/08; B62D 25/20; B62D 25/2009
USPC ... 296/156, 168, 180.4, 181.1, 182.1, 185.1, 296/186.1, 186.3, 186.4, 193.04, 193.05, 296/193.06, 193.07, 193.09; 105/396, 105/397, 399; 52/653.1, 656.9, 664, 667, 52/668
See application file for complete search history.

(56) References Cited

U.S. PATENT DOCUMENTS 4,059,303 A 11/1977 Mauri
6,273,497 B1 * 8/2001 Devallez ............... B61D 17/04
296/203.01

(Continued)

FOREIGN PATENT DOCUMENTS

CN 202358193 U 8/2012
CN 106627330 A * 5/2017 ............... B60P 3/32
DE 202018005759 U1 1/2019

OTHER PUBLICATIONS

Wang, "Limo housing capable of being disassembled and assembled", May 10, 2017, Edition: CN106627330A (Year: 2017).*

(Continued)

*Primary Examiner* — Dennis H Redder
*Assistant Examiner* — Joyce Eileen Hill
(74) *Attorney, Agent, or Firm* — Dinsmore & Shohl LLP

(57) ABSTRACT

A recreational vehicle has a floor and a vehicle body with a pair of walls, a roof, and end shells disposed at the front and rear ends of the walls and roof. Each wall has a plurality of horizontal members each extending at least part way between the front and back end of the respective wall and a plurality of spaced apart vertical bows each extending at least part way between the bottom and top of the respective wall. Each of the vertical bows has an inner surface and an outer surface with a recess defined in the inner or outer surface, the recess configured to receive one of the plurality of horizontal members therein such that the horizontal member does not extend beyond a portion of the inner or outer surface adjacent the recess. An outer wall skin is attached to the outer surface of the bows or members.

30 Claims, 12 Drawing Sheets

(56) References Cited

U.S. PATENT DOCUMENTS

| | | | |
|---|---|---|---|
| 6,464,288 B2* | 10/2002 | Moriaux | B62D 33/0612 |
| | | | 296/190.02 |
| 8,056,958 B2* | 11/2011 | Oriet | B60R 21/13 |
| | | | 296/178 |
| 10,507,875 B1 | 12/2019 | Ebnother et al. | |
| 2015/0102631 A1* | 4/2015 | Maclean | B62D 27/02 |
| | | | 296/168 |

OTHER PUBLICATIONS

Image of an RV shell located in a publication entitled "Wanderlust, Airstream at 75" Published by Greenwich Publishing Group, Inc. Old Saybrook, CT 2005.
European Search Report pertaining to Application No. 21196533.0 dated Jan. 28, 2022, 7 pages.

* cited by examiner

RV SHELL AND METHOD OF MANUFACTURE

FIELD OF THE INVENTION

The present disclosure is directed to a shell or body for a recreational vehicle and a method of manufacturing the shell or body for the recreational vehicle.

BACKGROUND OF THE INVENTION

Recreational vehicles take a variety of forms and are manufactured using different manufacturing methods. In one type of recreational vehicle, side walls are formed with vertical and horizontal members that are interconnected in a grid pattern and inner and outer wall skins are attached to the members. The assembly of the vertical and horizontal members and attachment of the skins may be very labor intensive and require a high degree of skill. There remains a need for alternative structures and methods of manufacture.

SUMMARY OF THE INVENTION

The present disclosure relates to recreational vehicles, utility trailers, and other similar vehicles. Recreational vehicles encompassed by the present disclosure include trailer-type recreational vehicles, which include fifth wheel trailers and other types of towable campers, toy haulers, etc. Recreational vehicles encompassed by the present disclosure also include motored recreational vehicles, like motor homes and other vehicles with their own motor and drive train. Recreational vehicles encompassed by the present disclosure further include single or double-axle utility trailers that are designed to be hauled using a personal automobile or truck.

The structure and method disclosed herein makes use of vertical bows that receive horizontal members and cooperate to support an outer wall skin. In accordance with one embodiment of the present disclosure, a recreational vehicle has a chassis with at least one axle, a generally horizontal floor, and a vehicle body. The vehicle body includes a pair of walls each having a bottom and a top and front and back ends. A roof having a pair of opposed edges and front and back ends, the roof spanning between the tops of the walls, a front end shell disposed at the front ends of the walls and roof, and a rear end shell disposed at the rear ends of the walls and roof. The walls, roof and shells cooperating to enclose an interior area. Each wall has a plurality of horizontal members each extending at least part way between the front and back end of the respective wall and a plurality of spaced apart vertical bows each extending at least part way between the bottom and top of the respective wall. Each of the vertical bows has an inner surface and an outer surface with a recess defined in the inner or outer surface. The recess is configured to receive one of the plurality of horizontal members therein such that the horizontal member does not extend beyond a portion of the inner or outer surface adjacent the recess. The wall also has an outer wall skin attached to the outer surface of at least some of the vertical bows and/or to at least some of the horizontal members.

In some examples, the recess defined in each of the vertical bows is an outer recess defined in the outer surface, and each bow also has an inner recess defined in the inner surface configured to receive another one of the plurality of horizontal members therein such that the horizontal member does not extend beyond the inner surface adjacent the recess.

In some examples, the plurality of vertical bows are disposed generally parallel to one another, the inner recesses of each of the vertical bows are vertically spaced from the outer recesses, a first one of the horizontal members extends between at least some of the vertical bows, is received in the outer recesses of the respective vertical bows, and is interconnected with the respective vertical bows, and a second one of the horizontal members extends between the at least some of the vertical bows, is received in the inner recesses of the respective vertical bows, and is interconnected with the respective vertical bows. The first and second horizontal members and the vertical bows interconnected therewith thereby form a grid.

The first and second horizontal members may each have a plurality of spaced apart holes defined therein, the holes in the first and second horizontal members each being spaced apart by a predefined bow spacing that is the same for each of the first and second horizontal members. The vertical bows may be interconnected with the first and second horizontal members at the holes such that the predefined bow spacing defines a spacing of the vertical bows.

In some examples, the outer wall skin is attached at the spaced apart holes in the horizontal members.

In some examples, the recess has a depth generally equal to a depth of the horizontal members such that when a horizontal member is received in the recess, a surface of the horizontal member is generally flush with the respective inner or outer surface of the vertical bow.

In some examples, the outer surface of each of the vertical bows is a convex curved outer surface, the inner surface of each of the vertical bows is a concave curved inner surface, and each of the horizontal members is a rectangular tube.

In some examples, the front end of each wall is generally aligned with the front end of the roof, the rear end of each wall is generally aligned with the rear end of the roof, and the outer wall skin has an upper edge disposed generally at upper ends of some of the vertical bows and a lower edge disposed generally at lower ends of some of the vertical bows.

In some examples, a plurality of roof bows each extend between the opposed edges and have an upper surface and a lower surface. Each of the roof bows has a central portion wherein the upper surface and the lower surface is flat and outboard portions wherein the upper and the lower surface are curved. An outer roof skin is attached to the upper surfaces of the plurality of roof bows. In some variations, floor-to-ceiling interior components are disposed against an inner surface of one of the walls, the floor-to-ceiling interior components each having an inner edge disposed outboard of the flat central portion of the lower surfaces of the roof bows. A central inner roof panel is attached to the flat central portion of the lower surfaces of the roof bows and has outboard edges that are inboard of the inner edges of the floor-to-ceiling interior components, thereby allowing removal of the central inner roof panel without removal of the floor-to-ceiling interior components.

Some variations include a bottom horizontal member disposed at the bottom of each wall and receiving lower ends of at least some of the vertical bows of the respective wall, with each bottom horizontal member having a floor receiving channel. A floor is disposed in and extends between the floor receiving channels of the bottom horizontal members. A top horizontal member is disposed at the top of each wall and has a lower channel receiving upper ends of at least some of the plurality of vertical bows of the respective wall and an upper channel receiving outer ends of each of the roof bows. The roof bows and the vertical bows may be positioned generally in longitudinal alignment.

In some examples, the recess in each of the vertical bows includes a flange for attachment to the one of the horizontal members received in the recess.

In some examples, each of the plurality of vertical bows is formed by stamping and has a generally C-shaped cross sectional shape along at least part of its vertical length.

In accordance with a further embodiment of the present disclosure, a method of manufacturing a recreational vehicle is provided. The method includes providing a first and a second horizontal member, forming a plurality of spaced apart holes in each of the horizontal members, the holes being spaced apart by a predefined bow spacing that is the same for each of the first and second horizontal members, providing a plurality of vertical bows each having a first receiving area configured to receive the first horizontal member therein and a second receiving area configured to receive the second horizontal member therein, the first and second receiving areas being vertically spaced apart, and receiving the first horizontal member in the first receiving area of each of the plurality of vertical bows and receiving the second horizontal member in the second receiving area of the plurality of vertical bows such that one of the spaced apart holes in each of the horizontal members is aligned with each of the receiving areas of the plurality of vertical bows, thereby spacing the plurality of vertical bows apart by the predefined bow spacing. Each of the plurality of spaced apart vertical bows is attached to the first and second horizontal members using the spaced apart holes formed in the horizontal members and an outer wall skin is attached to an outer surface of the vertical bows and/or horizontal members, thereby forming a wall with each of the plurality of vertical bows extending at least part way between a bottom and a top of the wall, and each of the horizontal members extending at least part way between a front and a back end of the wall.

In some examples of the method, each of the vertical bows has an inner surface and an outer surface, the first receiving area in each vertical bow is a recess defined in the outer surface and configured such that when the first horizontal member is received therein, the first horizontal member does not extend beyond a portion of the outer surface adjacent the recess, and the second receiving area in each vertical bow is a recess defined in the inner surface configured such that when the second horizontal member is received therein, the second horizontal member does not extend beyond a portion of the inner surface adjacent the recess.

The step of attaching the outer wall skin may include attaching the outer wall skin at the spaced apart holes in the first horizontal member that are also used to attach the plurality of vertical bows to the first horizontal member.

The step of attaching the outer wall skin and the plurality of vertical bows at the spaced apart holes further may include attaching the outer wall skin and the plurality of vertical bows using a single fastener at each hole.

In some examples of the method, the step of attaching the outer wall skin includes positioning the outer wall skin on the plurality of vertical bows and forming openings in the outer wall skin in alignment with the spaced apart holes in the first horizontal member and attaching the outer wall skin at the spaced apart holes in the first horizontal member.

The predefined bow spacing may include some holes that are more closely spaced than others of the holes.

In some examples of the method, a second wall is formed, including the steps of providing a first and a second horizontal member, forming a plurality of spaced apart holes in each of the horizontal members, the holes being spaced apart by a predefined bow spacing that is the same for each of the first and second horizontal members, providing a plurality of vertical bows each having a first receiving area configured to receive the first horizontal member therein and a second receiving area configured to receive the second horizontal member therein, the first and second receiving areas being vertically spaced apart, and receiving the first horizontal member in the first receiving area of each of the plurality of vertical bows and receiving the second horizontal member in the second receiving area of the plurality of vertical bows such that one of the spaced apart holes in each of the horizontal members is aligned with each of the receiving areas of the plurality of vertical bows, thereby spacing the plurality of vertical bows apart by the predefined bow spacing. Each of the plurality of spaced apart vertical bows is attached to the first and second horizontal members using the spaced apart holes formed in the horizontal members. An outer wall skin is attached to an outer surface of the vertical bows and/or horizontal members, thereby forming the second wall with each of the plurality of vertical bows extending at least part way between a bottom and a top of the wall, and each of the horizontal members extending at least part way between a front and a back end of the second wall. A roof is formed, having a pair of opposed edges and front and back ends, the roof comprising a plurality of roof bows extending between the opposed edges and an outer roof skin attached to upper surfaces of the plurality of roof bows. A front end shell and a rear end shell is formed. The opposed edges of the roof are interconnected with the tops of the respective walls, the front end shell is interconnected with the front ends of the roof and walls, and the rear end shell is interconnected with the rear ends of the roof and walls, thereby enclosing an interior area.

Although the concepts of the present disclosure are described herein with primary reference to recreational vehicles, it is contemplated that the concepts will enjoy applicability to any trailer, vehicle, or other application. For example, and not by way of limitation, it is contemplated that the concepts of the present disclosure will enjoy applicability to mobile homes.

BRIEF DESCRIPTION OF THE SEVERAL
VIEWS OF THE DRAWINGS

The following detailed description of specific embodiments of the present disclosure can be best understood when read in conjunction with the following drawings, where like structure is indicated with like reference numerals and in which.

DETAILED DESCRIPTION OF THE INVENTION

Figure 1:
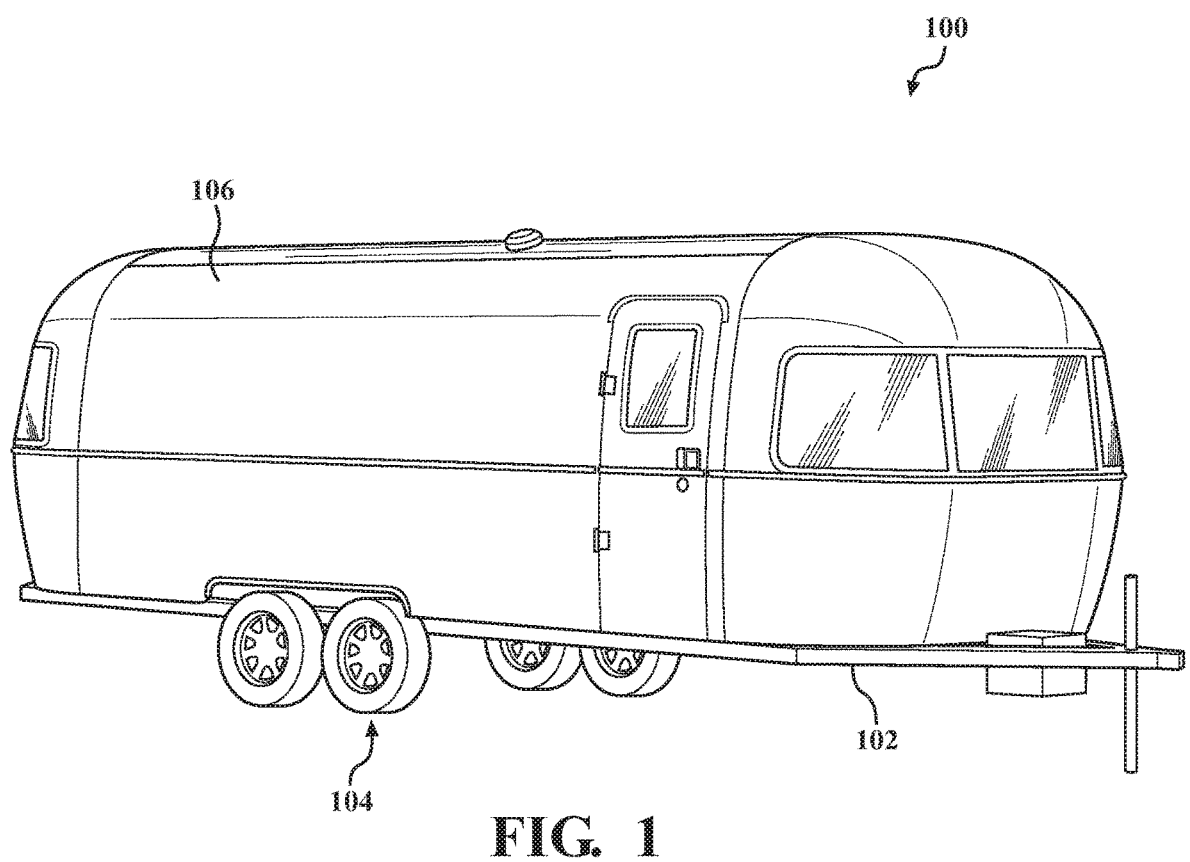
FIG. 1 is a perspective view of a recreational vehicle according to one embodiment of the present disclosure.
Figure 2:
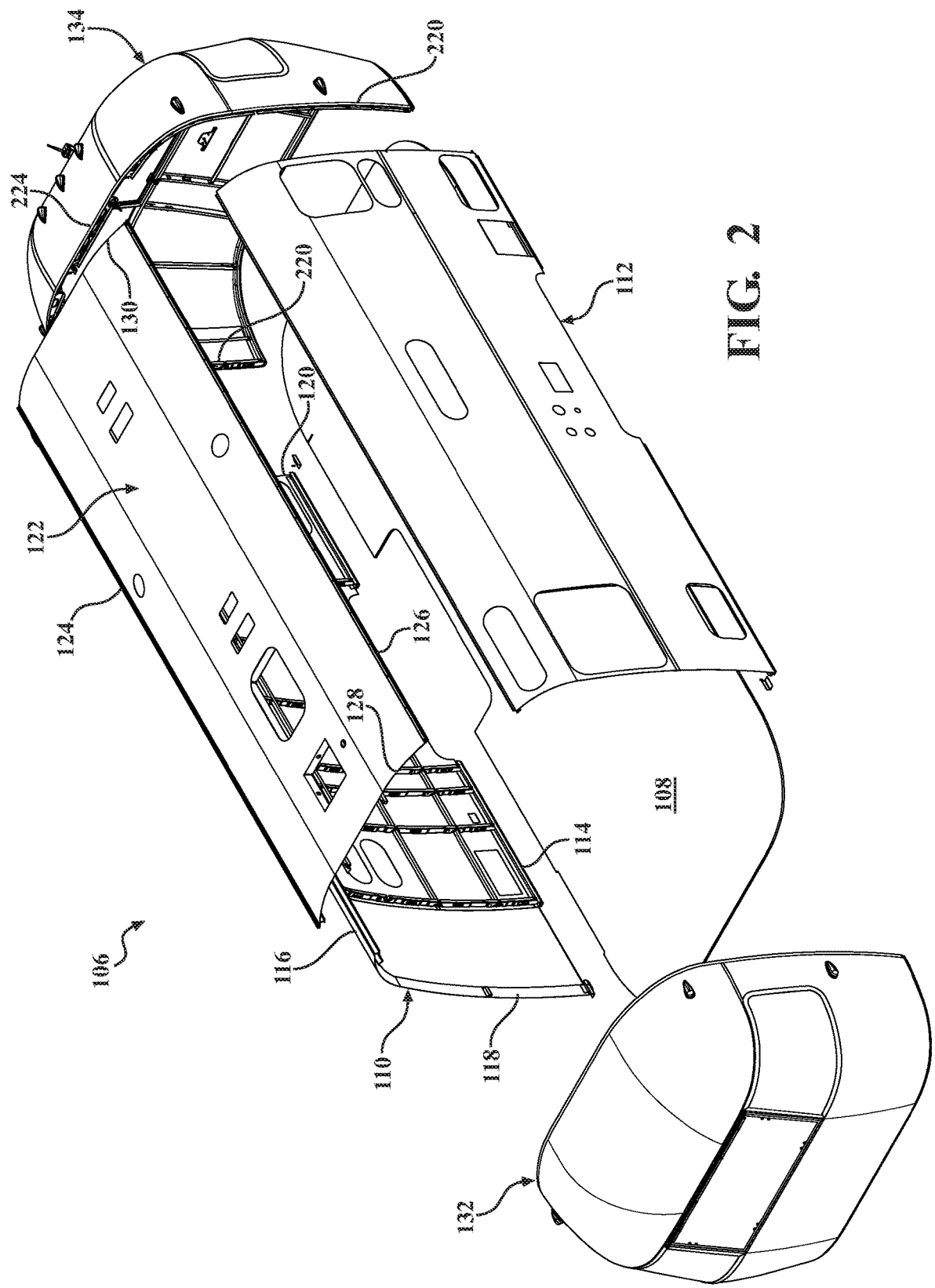
FIG. 2 is an exploded perspective view of the body of the recreational vehicle of FIG. 1.

FIG. 1 illustrates a recreational vehicle 100 comprising a chassis 102, at least one axle assembly 104 and a vehicle body 106. In this example, the recreational vehicle 100 is a trailer-type vehicle. FIG. 2 provides an exploded view of the body 106 along with a floor 108. The floor may or may not be considered part of the body, but is treated separately in this disclosure. The body has a pair of walls 110 and 112 forming the opposed sides of the body. The walls are generally similar in construction, though differ in the placement of doors, windows, and other details. For purposes of this disclosure, wall 110 will be described in detail with the understanding that similar considerations apply to wall 112. The wall 110 has a bottom 114, a top 116, a front end 118 and a rear end 120. A roof 122 has a pair of opposed edges 124 and 126 and a front end 128 and rear end 130. The roof spans between the tops of the walls 110 and 112. A front end shell 132 is disposed at the front ends of the walls and roof and a rear end shell 134 is disposed at the rear ends of the walls and roof. The walls 110 and 112, roof 122 and shells 132 and 134 cooperate to enclose an interior area of the recreational vehicle. In this example, the floor 108 is interconnected with and extends between the bottoms of the walls 110 and 112, and the entire assembly is supported by the chassis. Also in this example, the walls 110 and 112 and the roof 122 have the same length so that their front and back ends form a generally flat surface for mounting the end shells 132 and 134.

Figure 3:
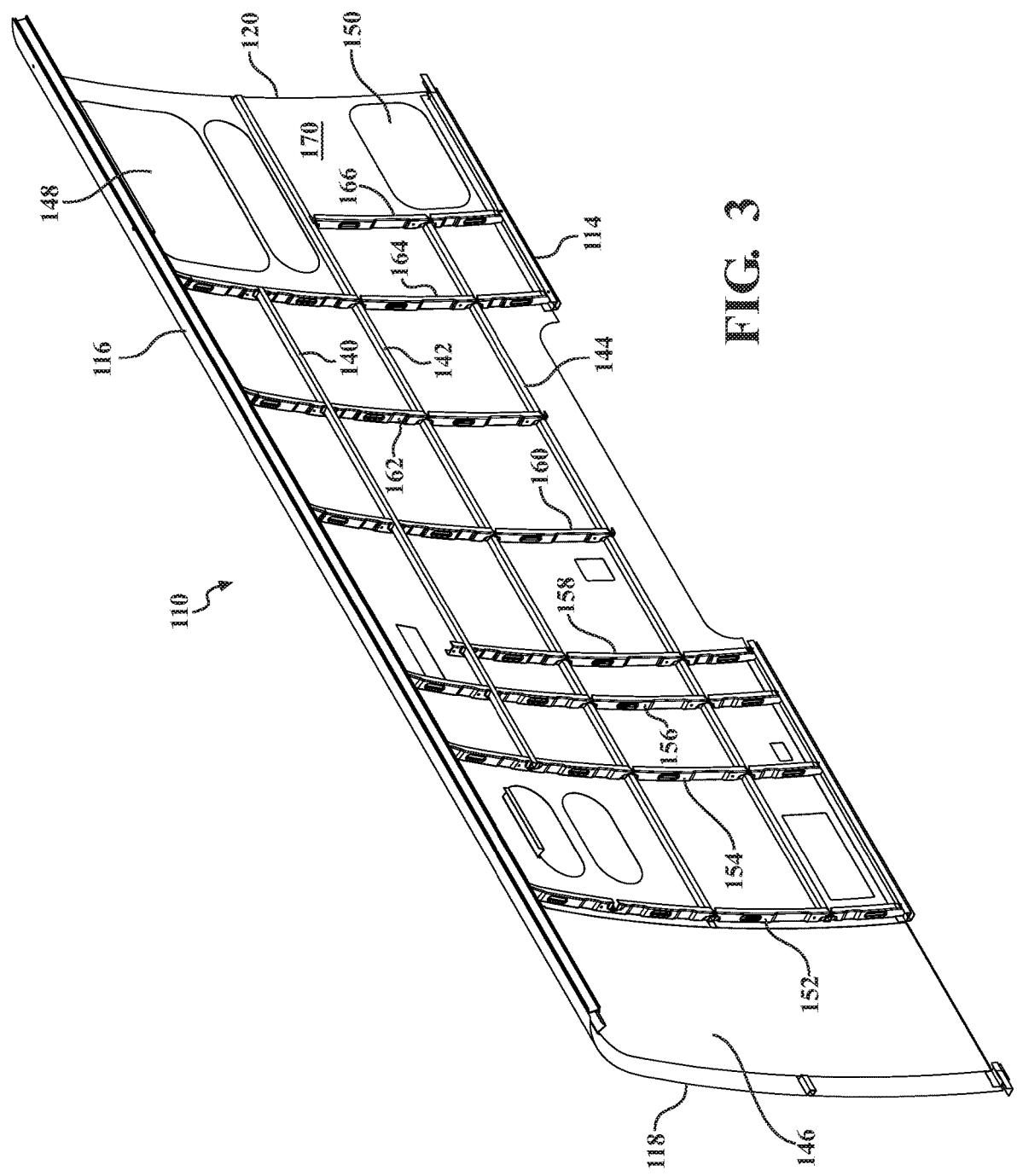
FIG. 3 is a perspective view of one wall of the body of the recreational vehicle according to an embodiment of the present disclosure.

Referring now to FIG. 3, the wall 110 will be described in more detail. The wall 110 has a plurality of horizontal members 140, 142, and 144 that each extend at least part way between the front end 118 and the rear end 120 of the wall 110. Depending on the configuration of the recreational vehicle and the design of the wall, the wall may have more or fewer horizontal members and their length may vary. In this example, the horizontal member 142 is a middle horizontal member positioned midway between the top 116 and bottom 114 of the wall 110. The middle horizontal member 142 is disposed generally horizontally and extends from the rear end 120 of the wall towards to the front end 118 but terminates short of the front end of the wall. This is due to the wall 110 having a door opening 146 provided therein. It is noted that terms such as vertical, horizontal, top and bottom are used merely for convenience and generally represent the positions of elements when the assembled recreational vehicle is positioned on a flat horizontal surface, but these terms are not limiting. As one example, the wall may be assembled in a different orientation than its final orientation, such as with the horizontal and vertical members both being supported on an assembly surface.

The horizontal member 140 is positioned above the middle horizontal member 142 and may be considered an upper horizontal member. In this example, it is midway between the middle horizontal member 142 and the top 116 of the wall. The upper horizontal member 140 also extends generally horizontally and is therefore parallel to the middle horizontal member 142. In this example, the upper horizontal member 140 is shorter than the middle horizontal member 142, so as not to interfere with window openings such as shown at 148.

The horizontal member 144 is positioned below the middle horizontal member 142 and may be considered a lower horizontal member. In this example, it is midway between the middle horizontal member 142 and the bottom 114 of the wall 110. The lower horizontal member 144 also extends generally horizontally and therefore is parallel to the middle and upper horizontal members 142 and 140. In this example, a forward end of the lower horizontal member 144 is in the same longitudinal position as a forward end of the middle horizontal member 142, adjacent the door opening 146. A rearward end of the lower horizontal member 144 stops short of the rear end 120 of the wall 110 to avoid interfering with an opening 150 in the wall.

The wall 110 further has a plurality of spaced apart vertical bows 152, 154, 156, 158, 160, 162, 164, and 166. Depending on the configuration of the recreational vehicle and the design of the wall, the wall may have more or fewer vertical bows and their height may vary. In this example, vertical bows 152, 154, 156 and 164 are full-height bows that extend from the bottom 114 to the top 116 of the wall 110 and the bows 158, 160, 162 and 166 are partial-height bows. Bows 158 and 166 extend from the bottom 114 part way to the top 116 and bows 160 and 162 extend from the top 116 part way to the bottom 114. The partial-height of some bows is to avoid interfering with openings or other features, such as wheel wells and windows.

The horizontal members and the vertical bows are interconnected with one another, as will be described herein, to generally provide a grid. An outer wall skin 170 is attached to outer surfaces of the bows and/or horizontal members to form the wall 110.

Figure 4:
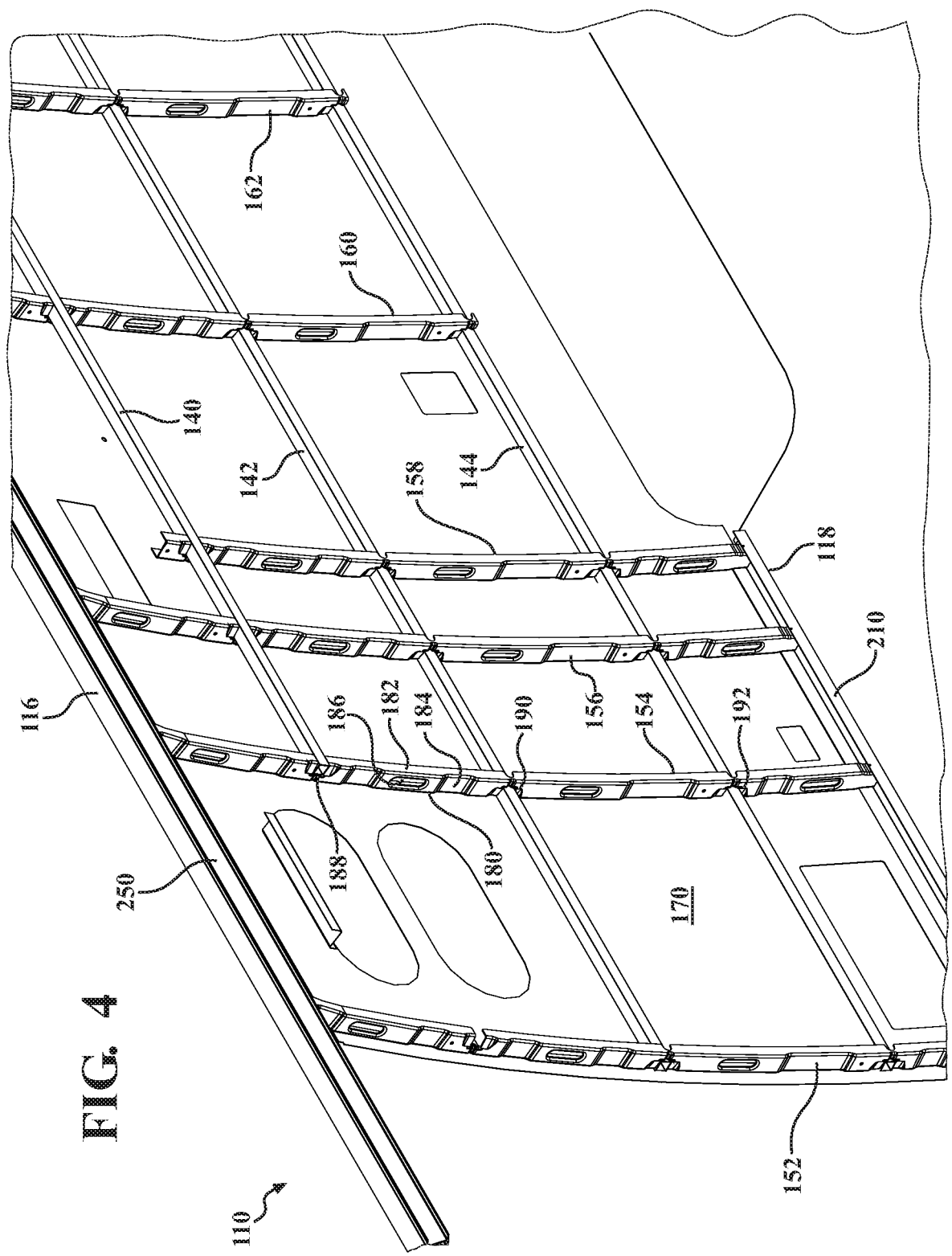
FIG. 4 is a detailed perspective view of a portion of the wall of FIG. 3.
Figure 5:
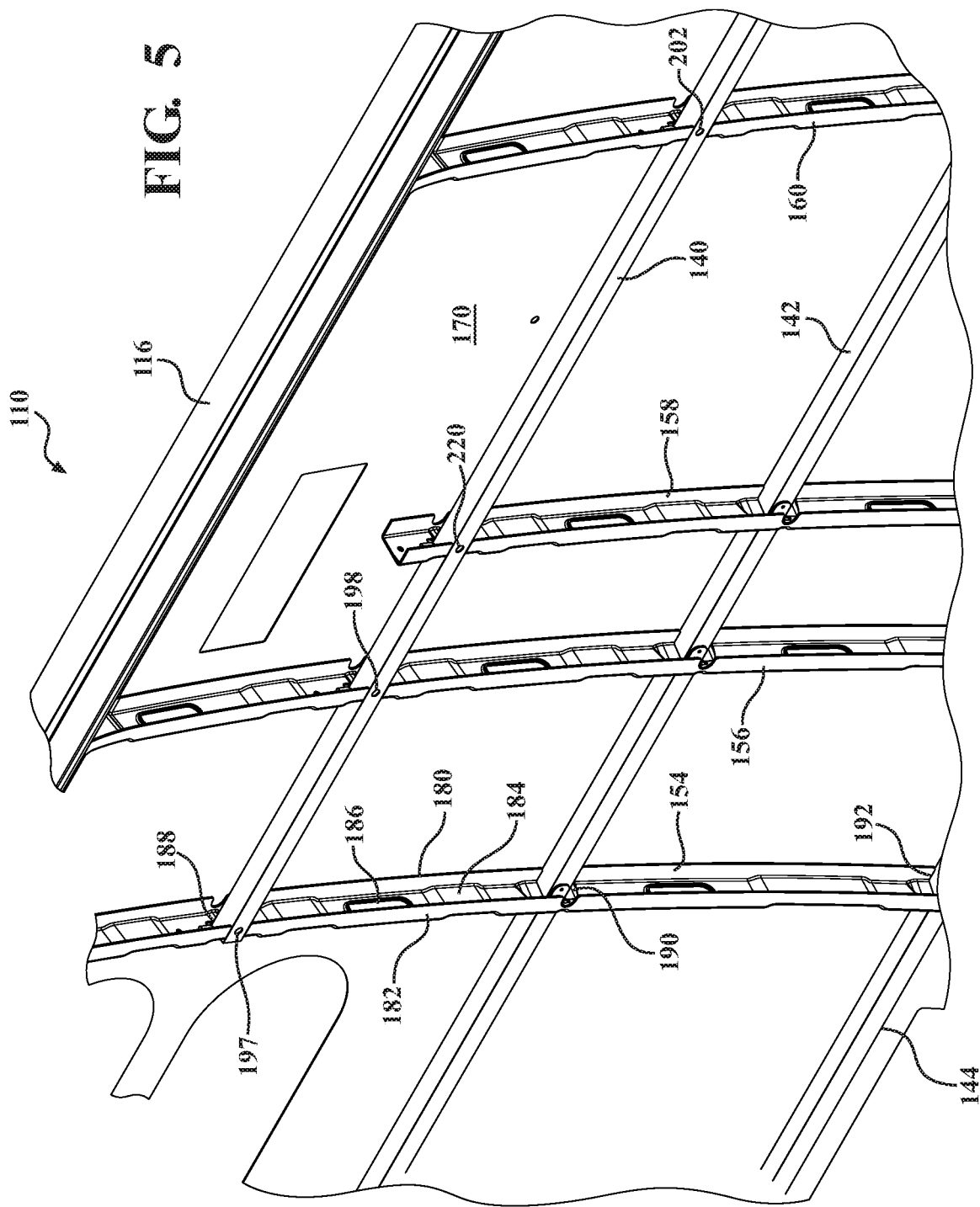
FIG. 5 is another detailed perspective view of a portion of the wall of FIG. 3.
Figure 6:
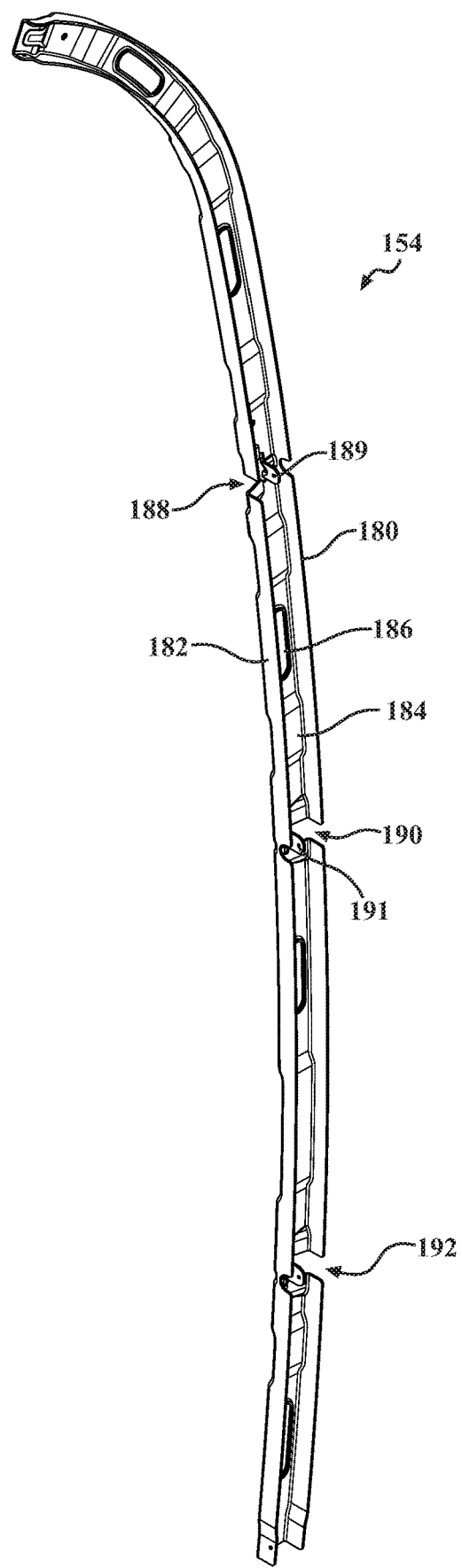
FIG. 6 is a perspective view of a vertical bow which may form part of a wall in according to an embodiment of the present disclosure.

FIGS. 4 and 5 provide more detailed views of portions of the wall 110, illustrating some of the vertical bows and horizontal members. FIG. 4 provides a perspective view looking rearwardly and showing more detail than in FIG. 3. FIG. 5 provides a perspective view looking forwardly and also showing more detail. FIG. 6 provides a perspective view of one full-height vertical bow. While the vertical bows and horizontal members may take a variety of forms, FIGS. 4-6 will be used to describe one exemplary design for the bows and members. Bows 154 and 156 are full-height bows, which extend from the bottom 114 to the top 116 of the wall 110. The bow in FIG. 6 represents bow 154. Bow 154 will be described in more detail with reference to FIGS. 4-6, with the understanding that the other vertical bows have similar features with the exception of height and certain details, for some of the bows, as will be discussed. As shown, the vertical bow 154 has a convex curved outer surface 180 and a concave curved inner surface 182, with the outer wall skin 170 being disposed on the outer surface 180. In this example, each of the vertical bows is stamped from metal, resulting in a generally C-shaped cross section. The "top" of the C forms an outer flange defining the outer surface 180 and the "bottom" of the C forms an inner flange defining the inner surface 182. The web 184 of the C extends between the inner and outer flanges. The web 184 may have openings defined therein, such as opening 186, for material reduction and/or providing for passage of wiring and other elements of the recreational vehicle.

In this example, the horizontal members, such as member 140 and 142, are rectangular or square tubing, which may be a non-custom item. The tubing is typically metal.

The vertical bows have recesses defined therein for receiving the horizontal members. As shown, vertical bow 154 has an upper recess 188 for receiving the upper horizontal member 140, a middle recess 190 for receiving the middle horizontal member 142, and a lower recess 192 for receiving the lower horizontal member 144. In this example, the recesses are formed in the inner and outer surfaces 180 and 182 and are configured such that when the respective horizontal member is received therein, the horizontal member does not extend beyond the respective inner or outer surface adjacent the recess. The recesses may also be referred to more generally as receiving areas.

Figure 7A:
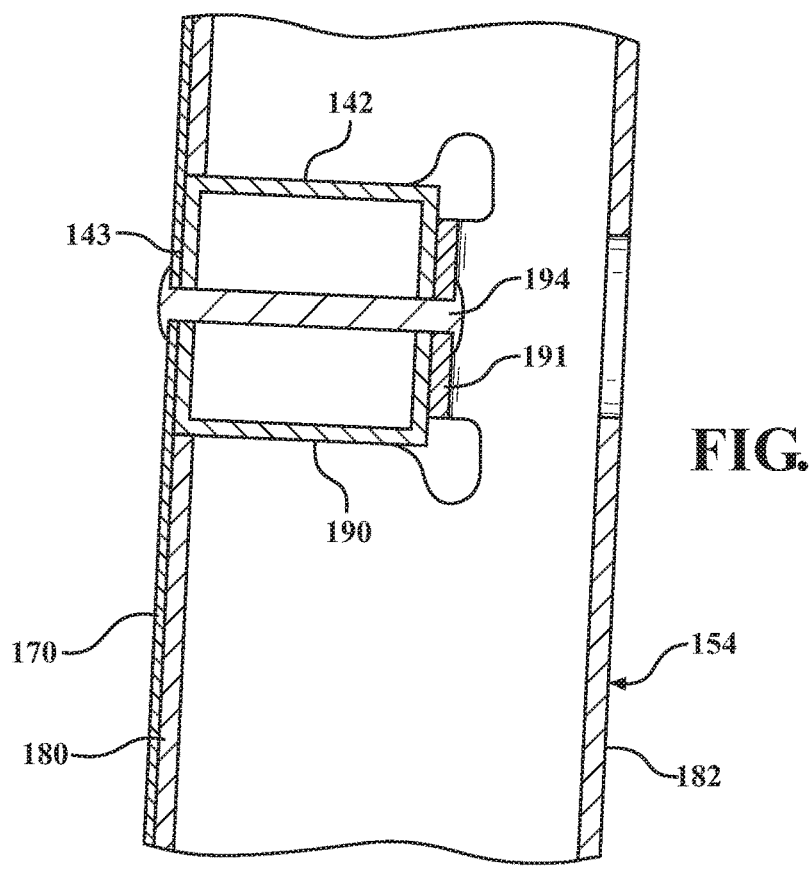
FIG. 7A is a detailed cross-sectional view of a portion of a vertical bow, showing an outer recess receiving a horizontal member according to an embodiment of the present disclosure.
Figure 7B:
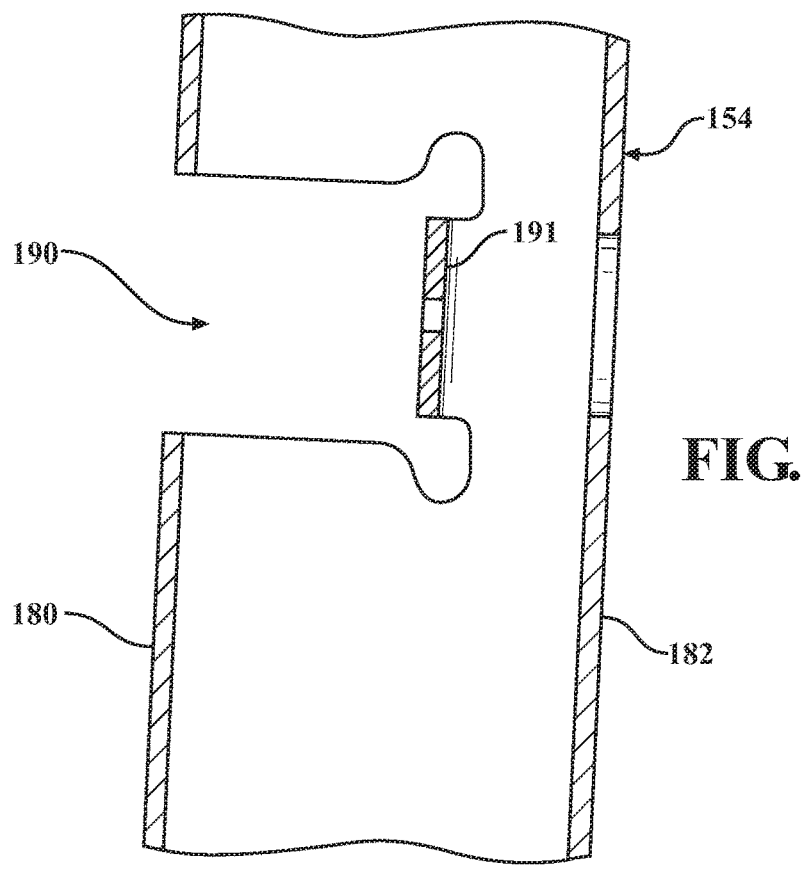
FIG. 7B is a view similar to FIG. 7A but with the horizontal member removed from the recess.

FIGS. 7A and 7B provide detailed cross-sectional views of a portion of bow 154 with the middle recess 190. FIG. 7A shows the recess 190 with the horizontal member 142 received therein and FIG. 7B shows the recess 190 without the horizontal member. In this example, the recess 190 is an outer recess defined in the outer surface 180 of the vertical bow 154. As best seen in FIG. 6, the recess 190 has a flange 191 at the back of the recess, farthest from the outer surface. In FIG. 7A, the flange 191 is shown in cross section disposed against the back surface of the horizontal member 142. The vertical bow 154 is interconnected with the horizontal member 142 by a fastener, such as rivet 194, extending through the flange 191 and horizontal member. As best shown in FIG. 7A, the recess 190 is configured such that when the horizontal member 142 is disposed therein, an outer surface 143 of the horizontal member is generally flush with the portions of the outer surface 180 of the vertical bow 154 immediately adjacent the recess 190. The term "generally flush" is intended to mean that the surfaces are close enough to flush to provide a surface that is smooth enough for attachment of the outer wall skin 170 without causing uneven loading or cosmetic problems.

In this example, the outer wall skin 170 is disposed against the outer surface 180 of the vertical bow 154 and also against the outer surface 143 of the horizontal member 142, and is attached thereto with the same fastener or rivet 194 that interconnects the bow 154 and horizontal member 142. A strip of high bond adhesive tape, not shown, may be provided between the outer wall skin 170 and the outer surface 180, to provide a thermal conduction barrier and a rivet seal layer.

Referring again to FIGS. 4 and 6, the lower recess 192 in the vertical bow 154 in this example is an outer recess constructed in the same way as the middle recess 190.

Figure 7C:
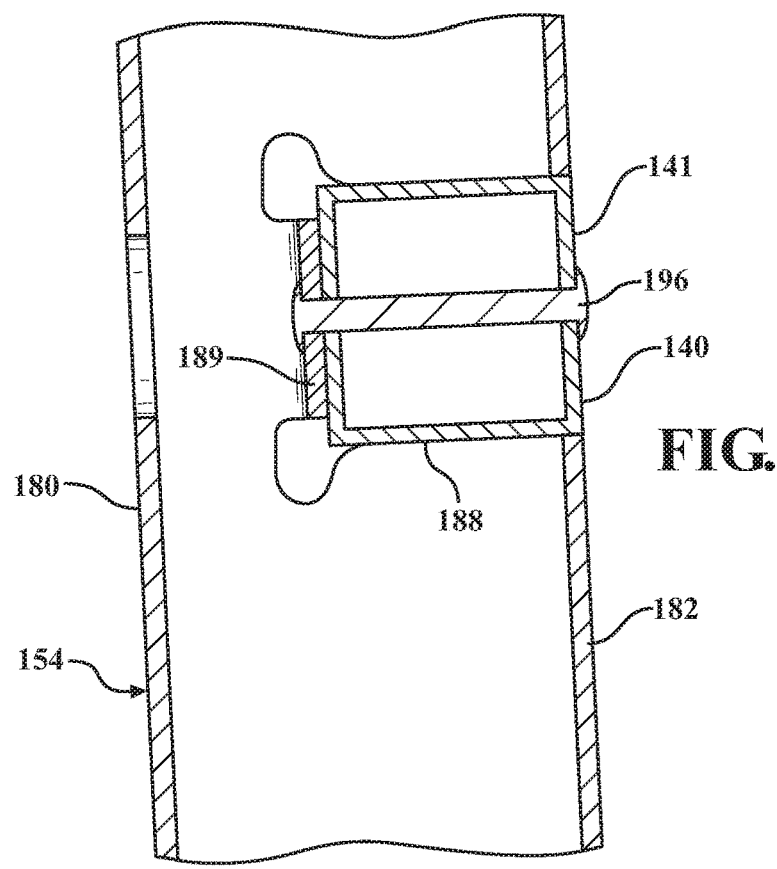
FIG. 7C is a detailed cross-sectional view of a portion of a vertical bow, showing an inner recess receiving a horizontal member according to an embodiment of the present disclosure.
Figure 7D:
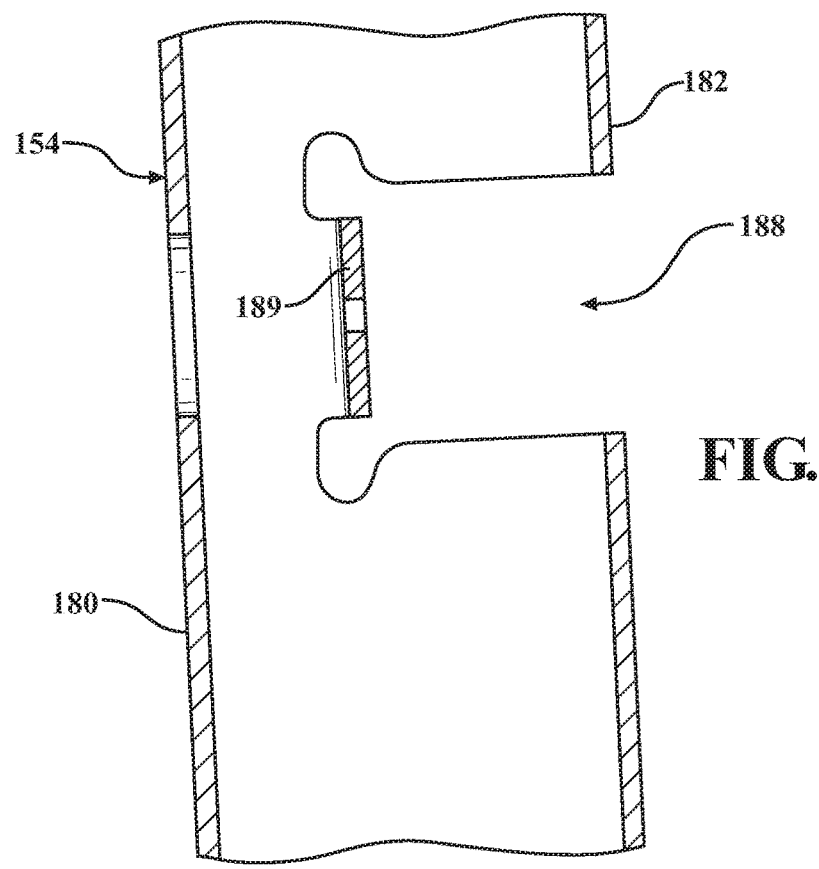
FIG. 7D is a view similar to FIG. 7C but with the horizontal member removed from the recess.

FIGS. 7C and 7D provide detailed cross-sectional views of a portion of bow 154 with the upper recess 188. FIG. 7C shows the recess 188 with the horizontal member 140 received therein and FIG. 7D shows the recess 188 without the horizontal member. In this example, the recess 188 is an inner recess defined in the inner surface 182 of the vertical bow 154. As best seen in FIG. 6, the recess 188 has a flange 189 at the back of the recess, farthest from the inner surface 182. In FIG. 7C, the flange 189 is shown in cross section disposed against the back surface of the horizontal member 140. The vertical bow 154 is interconnected with the horizontal member 140 by a fastener, such as rivet 196, extending through the flange 189 and horizontal member. As best shown in FIG. 7C, the recess 188 is configured such that when the horizontal member 140 is disposed therein, a surface 141 of the horizontal member is generally flush with the portions of the inner surface 182 of the vertical bow 154 immediately adjacent the recess 188. While not illustrated, an inner wall skin may be disposed against the inner surfaces and interconnected therewith.

It is noted that in this example, each recess 188-192 extends only part way from one of the surfaces to the other of the surfaces of the bow, thereby leaving space between the respective horizontal member and the other side of the wall. This allows for the vertical passage of wires and other elements without the need for cutting holes and providing grommets, etc. While the wall 110 is illustrated as having two outer recesses and one inner recess, it is possible to provide a different combination as well as more or fewer recesses and horizontal members.

According to a further aspect of the present invention, the horizontal members may provide a fixture-function in the assembly of a wall for a recreational vehicle. Referring to FIG. 5, hole 197 is shown in horizontal member 140, aligned with vertical bow 154. This hole 197 is to receive the rivet 196 for joining the horizontal member 140 to the vertical bow 154. Additional holes 198, 200, and 202 are shown spaced apart in horizontal member 140. In accordance with a manufacturing method, a first and a second horizontal member, such as members 140 and 142, are provided and a plurality of spaced apart holes, such as holes 197-202, are formed in these members, with the hole spacing being a predefined bow spacing. That is, these holes are used to determine the position of vertical bows attached thereto. This bow spacing may include some holes that are spaced farther apart, such as holes 197 and 198, and some holes that are spaced more closely together, such as holes 198 and 200. Holes are formed in each of the horizontal members and are spaced apart by the same bow spacing in each one.

As will be clear by reference to FIG. 3, not all bows are attached to all horizontal members, and vice versa, so some horizontal members will have more holes than others. However, at least a subset of these holes are the same in two or more horizontal members. The horizontal members with the holes are then disposed in the appropriate recesses in the vertical bows and interconnected therewith using these holes. This causes the vertical bows to be spaced apart by the predefined bow spacing, which may avoid or reduce the need for a jig to hold the vertical bows and horizontal members in position. This results in a grid of vertical bows and horizontal members. The outer wall skin may then be attached to the outer surfaces of some or all of the vertical bows and horizontal members, thereby forming the wall. In one example of the manufacturing method, the horizontal members are disposed in the recesses, the holes are aligned with the bows to position the bows and members, and then the outer wall skin is positioned against the horizontal members and the predefined holes are used to guide a drill for cutting holes in the skin. Then, a single fastener may attach the vertical bow to the horizontal member and the skin thereto. Alternatively, one fastener may be used to interconnect the bow and horizontal member and a different fastener used to attach the outer wall skin. The outer wall skin may be attached at additional locations to the vertical bows and horizontal members, and additional preformed holes may be provided. These additional holes are not considered as defining the bow spacing.

Figure 8:
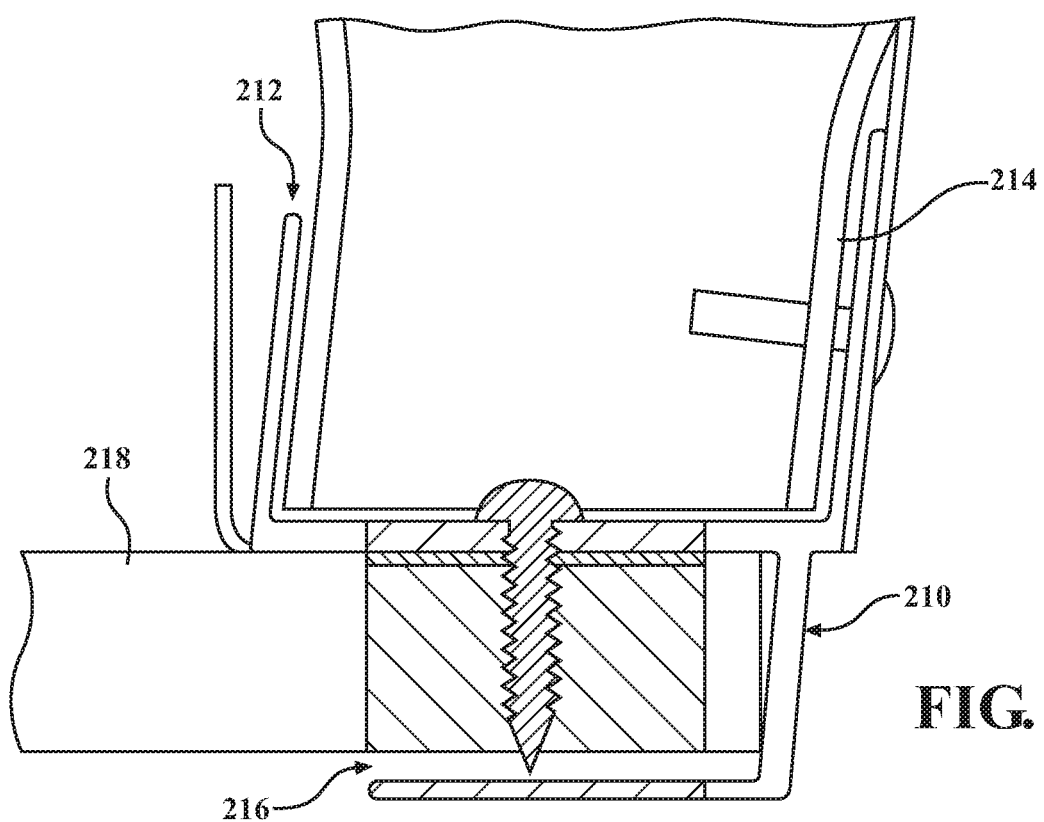
FIG. 8 is a detailed cross-sectional view of an area where the bottom of a wall is joined to a side edge of a floor according to an embodiment of the present disclosure.

Referring now to FIG. 8, one non-limiting approach to interconnecting a wall with a floor will be described. A bottom horizontal member 210 is shown in cross-section. The same bottom horizontal member is shown in FIG. 4 at the bottom 114 of the wall. The bottom horizontal member may be considered part of the wall or a separate structure. The bottom horizontal member 210 has an upper channel 212, for receiving a lower end 214 of at least some of the vertical bows, and a floor receiving channel 216 for receiving a side edge of a floor 218. The floor 218 is disposed in and extends between the floor receiving channels 216 of the bottom horizontal members 210 at the bottom of the opposed walls.

Figure 9:
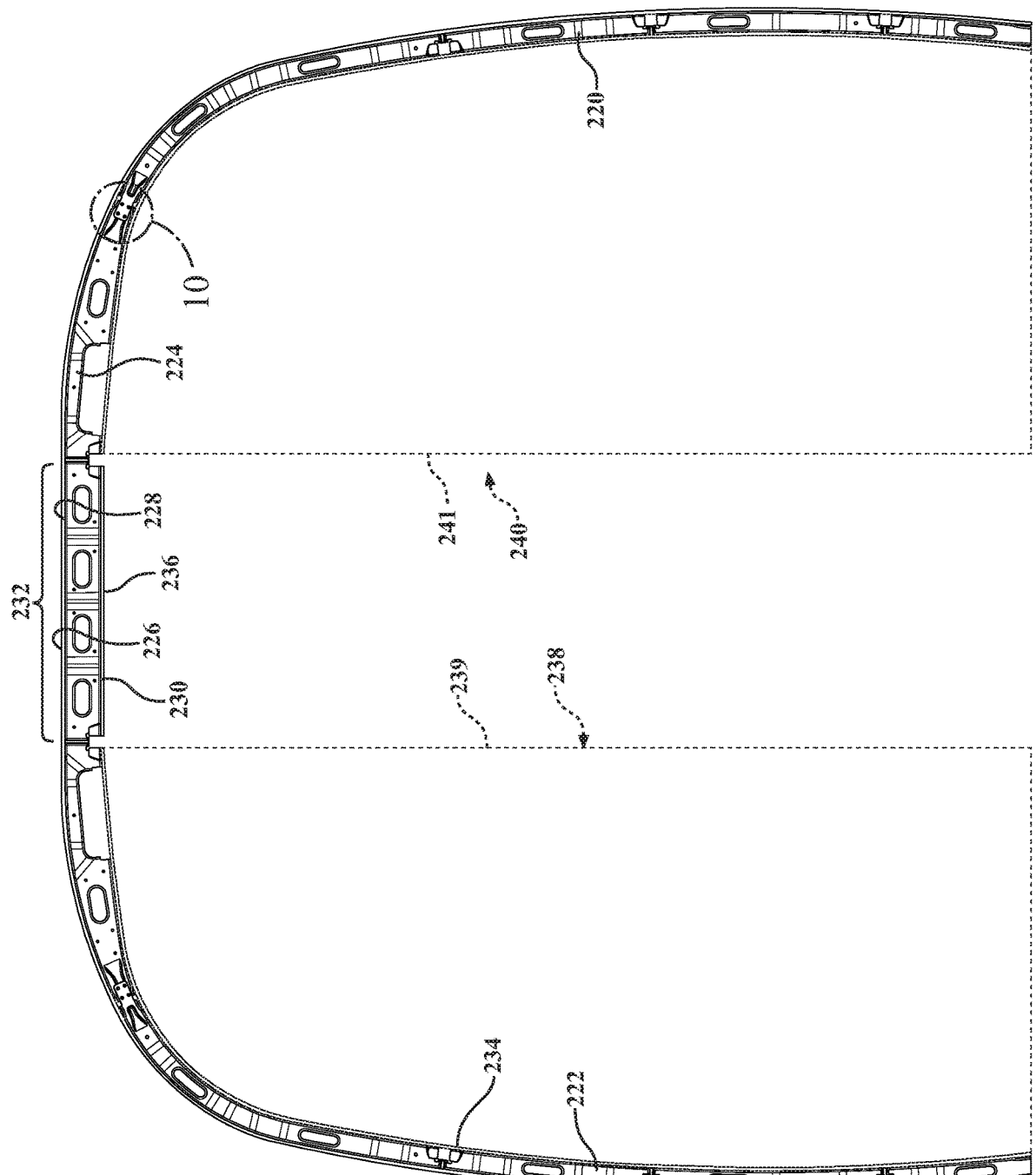
FIG. 9 is a view of two vertical bows interconnected by a roof bow according to an embodiment of the present invention.

FIG. 9 shows a pair of vertical bows 220 and 222 and a roof bow 224 extending therebetween. These bows may form part of the rear end shell 134, as shown in FIG. 2, though other of the bows are constructed similarly. In certain embodiments of the present disclosure, the roof bows 224 may be spaced apart and support an outer roof skin 226. At least some of the roof bows are longitudinally aligned with some of the vertical wall bows. In some examples, the roof bows 224 have an upper surface 228 and an inner surface 230. As shown, some embodiments of the present disclosure provide a recreational vehicle with a generally curved inner and outer profile. In some examples, the roof bows 224 have a central portion 232 wherein the inner surface 230 and/or outer surface 228 is flat, as shown, to allow for easier mounting of external equipment such as air conditioning units. The bows may have curved outer portions, outboard of the central portion. An inner wall skin 234 may be provided on the inner surfaces of the bows, and may be continuous or in multiple sections.

In one example, a central inner roof panel 236 is attached to the flat central portion 232 of the roof bows 224. Floor-to-ceiling interior components, such as walls and furniture, may be provided in the recreational vehicle, as represented by the dashed lines 238 and 240. These interior components may have inner edges 239 and 241, respectively, which are disposed outboard of the flat central inner roof panel 236, thereby allowing removal of the panel 236 without removal of the interior components. The outer roof skin may likewise have a central panel. In some embodiments, the flat central portion of the inner surface has a different width than the flat central portion of the outer surface.

Figure 10:
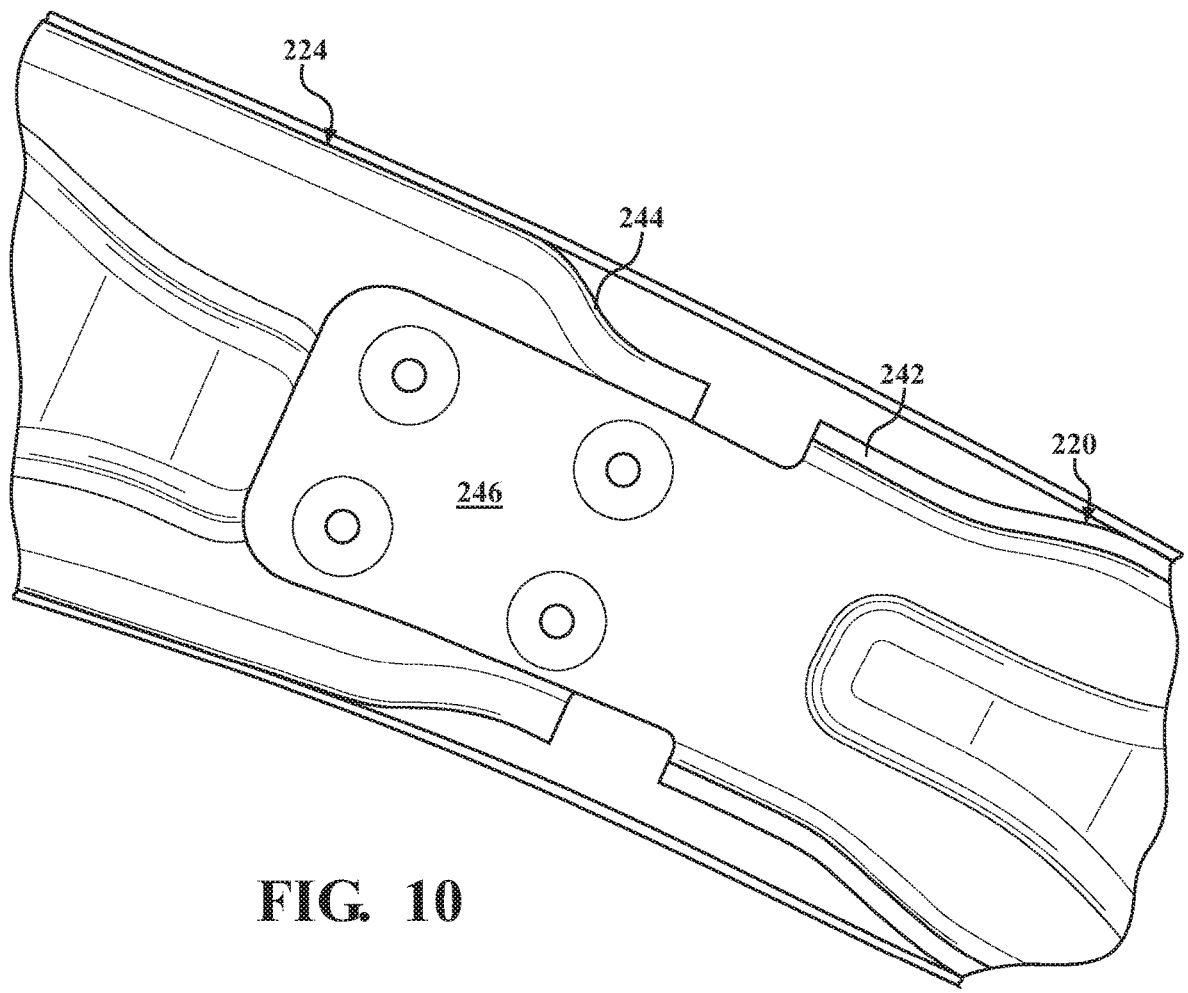
FIG. 10 is a detailed view of the area indicated at 10 in FIG. 9.
Figure 11:
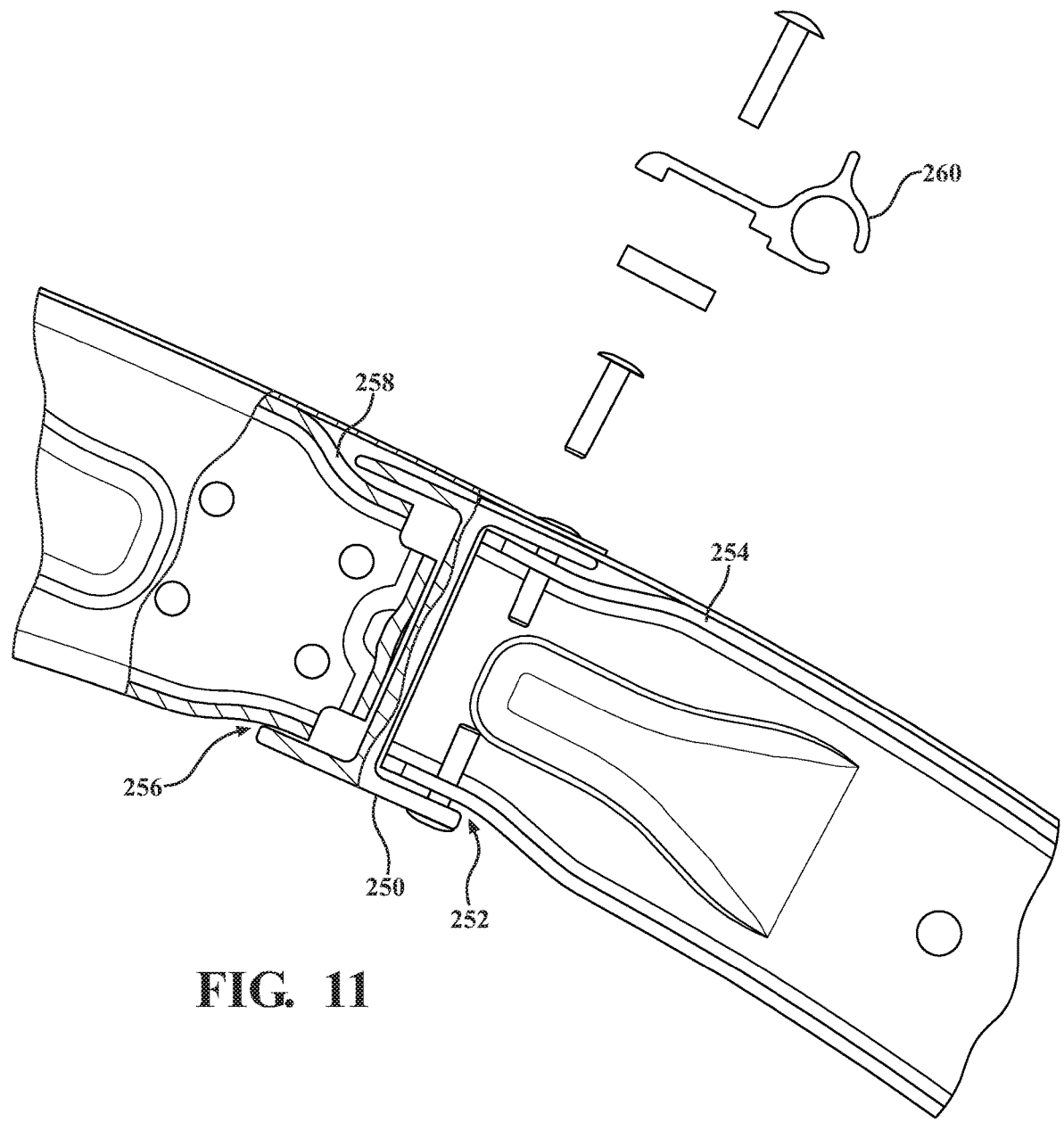
FIG. 11 is a detailed view of how a vertical bow may be interconnected with a roof bow according to an embodiment of the present disclosure.

FIG. 10 provides a detailed view of the area indicated at 10 in FIG. 9. As shown, the upper end 242 of the wall bow 220 may be interconnected with an outer end 244 of the roof bow 224 by a flange 246 extending from the upper 242 of the bow 220, which is fastened to the outer end 244 of the roof bow 224. This approach may be used for the bows at the front end and rear end shells. FIG. 11 shows an approach for interconnecting the remaining wall and roof bows for some embodiments. A top horizontal member 250 is shown in cross-section in FIG. 11 and at the top 116 of the wall 110 in FIG. 4. The top horizontal member may be I beam or H beam shaped with a lower channel 252 that receives upper ends 254 of the vertical wall bows and an upper channel 256 that received the outer ends 258 of the roof bows, which may be longitudinally aligned with the wall bows. The bows are interconnected with the horizontal top member. The outer wall skin may also be attached here, as well as a drip edge 260.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle of the type having a chassis with at least one axle, the recreational vehicle comprising:
   a generally horizontal floor;
   a vehicle body having;
      a pair of walls each having a bottom and a top and front and back ends;
      a roof having a pair of opposed edges and front and back ends, the roof spanning between the tops of the walls;
      a front end shell disposed at the front ends of the walls and roof; and
      a rear end shell disposed at the rear ends of the walls and roof;
      the walls, roof and shells cooperating to enclose an interior area;
   each wall comprising;
      a plurality of horizontal members each extending at least part way between the front and back end of the respective wall;
      a plurality of spaced apart generally parallel vertical bows each extending at least part way between the bottom and top of the respective wall, each of the vertical bows having an inner surface and an outer surface with an outer recess defined in the outer surface and an inner recess defined in the inner surface, the inner recess being vertically spaced from the outer recess in each of the plurality of vertical bows, each outer recess receiving a first one of the plurality of horizontal members therein and the inner recess receiving a second one of the plurality of horizontal members such that the horizontal members do not extend beyond a portion of the inner or outer surface adjacent the respective recesses;

the first one of the horizontal members extending between at least some of the vertical bows, is received in the outer recesses of the respective vertical bows, and is interconnected with the respective vertical bows; and the second one of the horizontal members extends between the at least some of the vertical bows, is received in the inner recesses of the respective vertical bows, and is interconnected with the respective vertical bows;

the first and second ones of the horizontal members and the plurality of vertical bows forming a grid; and an outer wall skin attached to the outer surface of at least some of the vertical bows and/or to at least some of the horizontal members.

2. The recreational vehicle according to claim 1, wherein:
the first and second horizontal members each have a plurality of spaced apart holes defined therein, the holes in the first and second horizontal members each being spaced apart by a predefined bow spacing that is the same for each of the first and second horizontal members;

the at least some of the vertical bows being interconnected with the first and second horizontal members at the holes such that the predefined bow spacing defines a spacing of the vertical bows.

3. The recreational vehicle according to claim 2, wherein the outer wall skin is attached at at least some of the spaced apart holes in the horizontal members.

4. The recreational vehicle according to claim 1, wherein each recess has a depth generally equal to a depth of the horizontal members such that when a horizontal member is received in each recess, a surface of the horizontal member is generally flush with the respective inner or outer surface of the vertical bow.

5. The recreational vehicle according to claim 1, wherein:
the outer surface of each of the vertical bows is a convex curved outer surface;
the inner surface of each of the vertical bows is a concave curved inner surface; and
each of the horizontal members is a rectangular tube.

6. The recreational vehicle according to claim 1, wherein:
the front end of each wall is generally aligned with the front end of the roof;
the rear end of each wall is generally aligned with the rear end of the roof; and
the outer wall skin has an upper edge disposed generally at upper ends of some of the vertical bows and a lower edge disposed generally at lower ends of some of the vertical bows.

7. The recreational vehicle according to claim 1, wherein the roof comprises:
a plurality of roof bows each extending between the opposed edges, each of the roof bows having an upper surface and a lower surface, each of the roof bows having a central portion wherein the upper surface and the lower surface is flat and outboard portions wherein the upper and the lower surface are curved; and
an outer roof skin attached to the upper surfaces of the plurality of roof bows.

8. The recreational vehicle according to claim 7, further comprising:
floor-to-ceiling interior components each disposed against an inner surface of one of the walls, the floor-to-ceiling interior components each having an inner edge disposed outboard of the flat central portion of the lower surfaces of the roof bows; and
a central inner roof panel attached to the flat central portion of the lower surfaces of the roof bows, the central inner roof panel having outboard edges that are inboard of the inner edges of the floor-to-ceiling interior components, thereby allowing removal of the central inner roof panel without removal of the floor-to-ceiling interior components.

9. The recreational vehicle according to claim 7, further comprising:
a bottom horizontal member disposed at the bottom of each wall and receiving lower ends of at least some of the vertical bows of the respective wall, each bottom horizontal member having a floor receiving channel;
a floor disposed in and extending between the floor receiving channels of the bottom horizontal members;
a top horizontal member disposed at the top of each wall, each top horizontal member having a lower channel receiving upper ends of at least some of the plurality of vertical bows of the respective wall and an upper channel receiving outer ends of each of the roof bows, the roof bows and the at least some of the vertical bows being positioned generally in longitudinal alignment.

10. The recreational vehicle according to claim 1, wherein each recess in each of the vertical bows includes a flange for attachment to the one of the horizontal members received in the recess.

11. The recreational vehicle according to claim 1, wherein each of the plurality of vertical bows is formed by stamping and has a generally C-shaped cross sectional shape along at least part of its vertical length.

12. A method of manufacturing a recreational vehicle, comprising:
providing a first and a second horizontal member;
forming a plurality of spaced apart holes in each of the horizontal members, the holes being spaced apart by a predefined bow spacing that is the same for each of the first and second horizontal members;
providing a plurality of vertical bows each having a first receiving area configured to receive the first horizontal member therein and a second receiving area configured to receive the second horizontal member therein, the first and second receiving areas being vertically spaced apart, each of the vertical bows having an inner surface and an outer surface, the first receiving area in each vertical bow being a recess defined in the outer surface and the second receiving area in each vertical bow being a recess defined in the inner surface;
receiving the first horizontal member in the first receiving area of each of the plurality of vertical bows and receiving the second horizontal member in the second receiving area of the plurality of vertical bows such that one of the spaced apart holes in each of the horizontal members is aligned with each of the receiving areas of the plurality of vertical bows, thereby spacing the plurality of vertical bows apart by the predefined bow spacing;
wherein each recess in the outer surface is configured such that when the first horizontal member is received therein, the first horizontal member does not extend beyond a portion of the outer surface adjacent the recess and each recess in the inner surface is configured such that when the second horizontal member is received therein, the second horizontal member does not extend beyond a portion of the inner surface adjacent the recess;

attaching each of the plurality of spaced apart vertical bows to the first and second horizontal members using the spaced apart holes formed in the horizontal members; and attaching an outer wall skin to an outer surface of the vertical bows and/or horizontal members, thereby forming a wall with each of the plurality of vertical bows extending at least part way between a bottom and a top of the wall, and each of the horizontal members extending at least part way between a front and a back end of the wall.

13. The method according to claim 12, wherein the step of attaching the outer wall skin comprises attaching the outer wall skin at the spaced apart holes in the first horizontal member that are also used to attach the plurality of vertical bows to the first horizontal member.

14. The method according to claim 13, wherein the step of attaching the outer wall skin and the plurality of vertical bows at the spaced apart holes further comprises attaching the outer wall skin and the plurality of vertical bows using a single fastener at each hole.

15. The method according to claim 12, wherein the step of attaching the outer wall skin comprises:
 positioning the outer wall skin on the plurality of vertical bows and forming openings in the outer wall skin in alignment with the spaced apart holes in the first horizontal member; and
 attaching the outer wall skin at the spaced apart holes in the first horizontal member.

16. The method according to claim 12, wherein the predefined bow spacing comprises some holes that are more closely spaced than others of the holes.

17. The method according to claim 12, further comprising:
 forming a second wall, comprising the steps of;
  providing a first and a second horizontal member;
  forming a plurality of spaced apart holes in each of the horizontal members, the holes being spaced apart by a predefined bow spacing that is the same for each of the first and second horizontal members;
  providing a plurality of vertical bows each having a first receiving area configured to receive the first horizontal member therein and a second receiving area configured to receive the second horizontal member therein, the first and second receiving areas being vertically spaced apart;
  receiving the first horizontal member in the first receiving area of each of the plurality of vertical bows and receiving the second horizontal member in the second receiving area of the plurality of vertical bows such that one of the spaced apart holes in each of the horizontal members is aligned with each of the receiving areas of the plurality of vertical bows, thereby spacing the plurality of vertical bows apart by the predefined bow spacing;
  attaching each of the plurality of spaced apart vertical bows to the first and second horizontal members using the spaced apart holes formed in the horizontal members; and
  attaching an outer wall skin to an outer surface of the vertical bows and/or horizontal members, thereby forming the second wall with each of the plurality of vertical bows extending at least part way between a bottom and a top of the wall, and each of the horizontal members extending at least part way between a front and a back end of the second wall;

forming a roof having a pair of opposed edges and front and back ends, the roof comprising a plurality of roof bows extending between the opposed edges and an outer roof skin attached to upper surfaces of the plurality of roof bows;
 forming a front end shell and a rear end shell;
 interconnecting the opposed edges of the roof with the tops of the respective walls;
 interconnecting the front end shell with the front ends of the roof and walls; and
 interconnecting the rear end shell with the rear ends of the roof and walls;
 thereby enclosing an interior area.

18. A recreational vehicle of the type having a chassis with at least one axle, the recreational vehicle comprising:
 a generally horizontal floor;
 a vehicle body having;
  a pair of walls each having a bottom and a top and front and back ends;
  a roof having a pair of opposed edges and front and back ends, the roof spanning between the tops of the walls, the roof having a plurality of roof bows each extending between the opposed edges, each of the roof bows having an upper surface and a lower surface, and an outer roof skin attached to the upper surfaces of the plurality of roof bows;
  a front end shell disposed at the front ends of the walls and roof; and
  a rear end shell disposed at the rear ends of the walls and roof;
  the walls, roof and shells cooperating to enclose an interior area;
 each wall comprising;
  a plurality of horizontal members each extending at least part way between the front and back end of the respective wall;
  a plurality of spaced apart vertical bows each extending at least part way between the bottom and top of the respective wall, each of the vertical bows having an inner surface and an outer surface with a recess defined in the inner or outer surface, the recess configured to receive one of the plurality of horizontal members therein such that the horizontal member does not extend beyond a portion of the inner or outer surface adjacent the recess;
  an outer wall skin attached to the outer surface of at least some of the vertical bows and/or to at least some of the horizontal members;
 a bottom horizontal member disposed at the bottom of each wall and receiving lower ends of at least some of the vertical bows of the respective wall, each bottom horizontal member having a floor receiving channel;
 a floor disposed in and extending between the floor receiving channels of the bottom horizontal members;
 a top horizontal member disposed at the top of each wall, each top horizontal member having a lower channel receiving upper ends of at least some of the plurality of vertical bows of the respective wall and an upper channel receiving outer ends of each of the roof bows, the roof bows and the at least some of the vertical bows being positioned generally in longitudinal alignment.

19. The recreational vehicle according to claim 18, wherein each of the roof bows has a central portion wherein the upper surface and the lower surface is flat and outboard portions wherein the upper and the lower surface are curved.

20. The recreational vehicle according to claim 18, wherein the recess defined in each of the vertical bows comprises an outer recess defined in the outer surface, each of the vertical bows further having an inner recess defined in the inner surface configured to receive another one of the plurality of horizontal members therein such that the horizontal member does not extend beyond the inner surface adjacent the recess.

21. The recreational vehicle according to claim 20, wherein:
   the plurality of vertical bows are disposed generally parallel to one another;
   the inner recesses of each of the vertical bows are vertically spaced from the outer recesses;
   a first one of the horizontal members extends between at least some of the vertical bows, is received in the outer recesses of the respective vertical bows, and is interconnected with the respective vertical bows; and
   a second one of the horizontal members extends between the at least some of the vertical bows, is received in the inner recesses of the respective vertical bows, and is interconnected with the respective vertical bows;
   whereby the first and second horizontal members and the vertical bows interconnected therewith form a grid.

22. The recreational vehicle according to claim 21, wherein:
   the first and second horizontal members each have a plurality of spaced apart holes defined therein, the holes in the first and second horizontal members each being spaced apart by a predefined bow spacing that is the same for each of the first and second horizontal members;
   the at least some of the vertical bows being interconnected with the first and second horizontal members at the holes such that the predefined bow spacing defines a spacing of the vertical bows.

23. The recreational vehicle according to claim 22, wherein the outer wall skin is attached at at least some of the spaced apart holes in the horizontal members.

24. The recreational vehicle according to claim 18, wherein the recess has a depth generally equal to a depth of the horizontal members such that when a horizontal member is received in the recess, a surface of the horizontal member is generally flush with the respective inner or outer surface of the vertical bow.

25. A recreational vehicle of the type having a chassis with at least one axle, the recreational vehicle comprising:
   a generally horizontal floor;
   a vehicle body having;
      a pair of walls each having a bottom and a top and front and back ends;
      a roof having a pair of opposed edges and front and back ends, the roof spanning between the tops of the walls;
      a front end shell disposed at the front ends of the walls and roof; and
      a rear end shell disposed at the rear ends of the walls and roof;
      the walls, roof and shells cooperating to enclose an interior area;
      each wall comprising;
         a plurality of horizontal members each extending at least part way between the front and back end of the respective wall;
         a plurality of spaced apart vertical bows each extending at least part way between the bottom and top of the respective wall, each of the vertical bows having an inner surface and an outer surface with a recess defined in the inner or outer surface, the recess configured to receive one of the plurality of horizontal members therein such that the horizontal member does not extend beyond a portion of the inner or outer surface adjacent the recess, the recess in each of the vertical bows including a flange for attachment to the one of the horizontal members received in the recess; and
         an outer wall skin attached to the outer surface of at least some of the vertical bows and/or to at least some of the horizontal members.

26. The recreational vehicle according to claim 25, wherein the recess defined in each of the vertical bows comprises an outer recess defined in the outer surface, each of the vertical bows further having an inner recess defined in the inner surface configured to receive another one of the plurality of horizontal members therein such that the horizontal member does not extend beyond the inner surface adjacent the recess.

27. The recreational vehicle according to claim 26, wherein:
   the plurality of vertical bows are disposed generally parallel to one another;
   the inner recesses of each of the vertical bows are vertically spaced from the outer recesses;
   a first one of the horizontal members extends between at least some of the vertical bows, is received in the outer recesses of the respective vertical bows, and is interconnected with the respective vertical bows; and
   a second one of the horizontal members extends between the at least some of the vertical bows, is received in the inner recesses of the respective vertical bows, and is interconnected with the respective vertical bows;
   whereby the first and second horizontal members and the vertical bows interconnected therewith form a grid.

28. The recreational vehicle according to claim 27, wherein:
   the first and second horizontal members each have a plurality of spaced apart holes defined therein, the holes in the first and second horizontal members each being spaced apart by a predefined bow spacing that is the same for each of the first and second horizontal members;
   the at least some of the vertical bows being interconnected with the first and second horizontal members at the holes such that the predefined bow spacing defines a spacing of the vertical bows.

29. The recreational vehicle according to claim 28, wherein the outer wall skin is attached at at least some of the spaced apart holes in the horizontal members.

30. The recreational vehicle according to claim 25, wherein the recess has a depth generally equal to a depth of the horizontal members such that when a horizontal member is received in the recess, a surface of the horizontal member is generally flush with the respective inner or outer surface of the vertical bow.

\* \* \* \* \*